July 23, 1940. S. G. SAUNDERS ET AL 2,208,647
COATING MATERIAL RECOVERY PROCESS
Filed Oct. 15, 1937
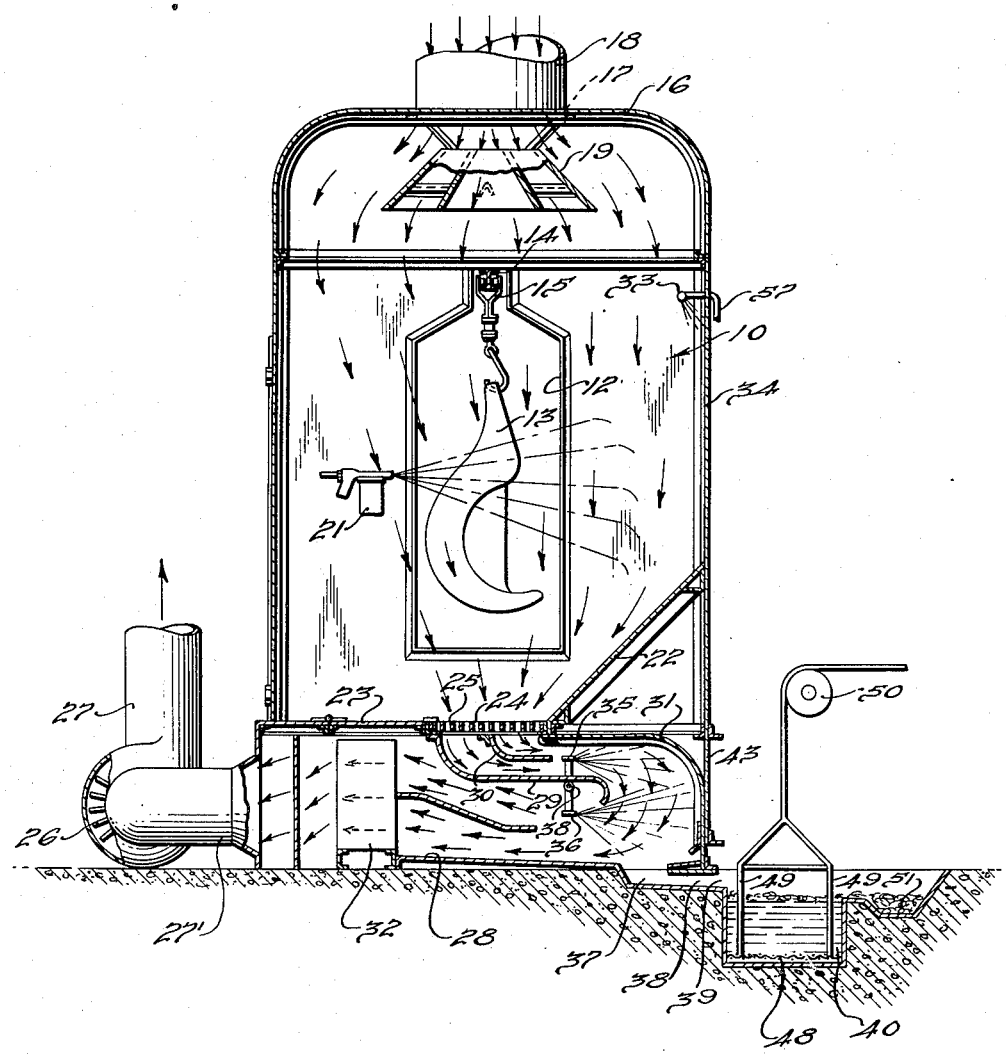
INVENTORS
SEYMOUR G. SAUNDERS
BY AND HARRY MORRISON.
ATTORNEYS.

Patented July 23, 1940

2,208,647

UNITED STATES PATENT OFFICE 2,208,647

COATING MATERIAL RECOVERY PROCESS

Seymour G. Saunders, Bloomfield Hills, and Harry Morrison, Detroit, Mich., assignors to Chrysler Corporation, Highland Park, Mich., a corporation of Delaware Application October 15, 1937, Serial No. 169,279

5 Claims. (Cl. 134—1)

This invention relates to an improved process and medium for recovering the non-volatile ingredients, commonly called solids, of excess sprayed surface coating materials and for preventing sticking of such material and their solids to the walls in which they are contained and it is a further development of the inventions described in United States Letters Patent No. 2,086,514 and No. 2,086,367.

More particularly the invention pertains to the recovery of solids, from the atmosphere and from the walls of spray chambers in which paint, lacquer, natural enamel, synthetic enamel and the like are being applied.

The term "solids" as used herein and as conventionally employed in the surface coating art refers to those portions of surface coating material which remain, either in their initial or chemically altered form, in a normally set deposit of such coating materials, including the non-volatile vehicle and pigment if the latter is present in the coating material.

One of the main objects of the invention is the provision of an improved recovery process and recovery medium which will meet all of the recovery process and recovery medium requirements set forth in said above mentioned patents and which in addition embodies the use of a true solution which may have relatively low solute concentration and in the use of which are involved none of the problems of maintaining an emulsion or suspension.

Another object of the invention is to provide a recovery medium of this character which is insoluble in any of the conventional surface coating material solvents and which is stable even at comparatively low temperatures in the absence of alkalinity or other characteristics which tend to injure the recovered products.

A further object of the invention is the provision of a recovery medium of this kind which is generally compatible with the finished materials resulting from the recovered products and which therefore need not be removed with that precision which is required when the presence of the recovery medium has a detrimental effect upon the recovery product.

A still further object of the invention is the provision of a recovery medium of this character which has an improved capacity for rendering the recovery material non-adhesive to the surface by which it is contained.

Additional objects of the invention are the provision of an improved recovery medium in which the solids of coating materials are insoluble and thus precipitate, to provide a recovery medium of this character in the presence of which conversion of the recovered product to an insoluble or other state not suitable for re-use is prevented and in which the solids are precipitated in a readily removable form and having the various ingredients thereof present in re-usable proportions, to provide a coating material solids precipitating medium of this kind which retains the resulting precipitate in such state that it can be re-dissolved in solvents of the same character as those from which it was previously recovered to form a coating material of the same order as that in which the solids had initially been included.

Another object of the invention is the provision of a medium of this character which can be used to advantage in the absence of actual recovery of surface coating material solids for the purpose of preventing adhesion of excess sprayed coating material to the surfaces in which it is contained so as to thereby eliminate the necessity of shutdown for cleaning operations.

An illustrative embodiment of the invention is shown in the accompanying drawing, in which:

The figure is a diagrammatic vertical sectional view of a spray booth illustrating a recovery process embodying the invention in which the improved recovery medium is adopted to be employed.

The improved recovery medium comprises a water solution, of suitable concentration, of an alkali salt of a sulphonated hydrocarbon of the resin class. Alkali salts such as sodium, potassium or calcium sulphonated abietine in water are particularly suitable for the recovery of paints, lacquers including cellulose and other base types, natural and synthetic resin base surface coating materials, gum and oil base undercoat paints and gum and oil base varnishes.

Abietine may be produced by heating in an iron still a charge of colophony resin of substantially any grade at a temperature sufficiently high to cause foaming thereof. When the foaming of the resin stops, usually about 10 minutes after the charge has melted, a charge of clean, dry iron filings is placed in the still and a reflux column having a thermometer is applied thereto. The bath is then refluxed for approximately four hours at 350° C. After this stage, the reflux column is removed from the still and replaced by a distillation column and all the material of the still is distilled over up to a distillation temperature of 450° C. The resulting product is known as abietine.

Although a colophony resin base abietine is preferred for the purpose of manufacturing recovery medium, suitable materials may be provided for this purpose by treating in the above manner gums such as kauri, damar as well as the residue of the distillation of cottonseed oil, known as cottonseed oil pitch.

The abietine or equivalent composition may then be sulphonated by adding five hundred parts by weight into one thousand parts by weight of concentrated sulphuric acid which has been cooled to substantially 10° C. This addition to the sulphuric acid is made preferably in drop by drop manner over a period of substantially two hours during constant stirring. The stirring is continued for about twenty hours while the temperature of the product is maintained at substantially 0° to 15° C. One thousand parts by weight of water is then added and the top layer of the resulting mixture is separated, in a separatory funnel for example, thus obtaining sulphonated abietine.

The alkali salt of the sulphonated abietine may be conveniently produced by neutralizing the latter with sodium, potassium, calium hydroxides or other suitable alkali. Water may be readily removed from the salt by evaporation and the latter may be powdered for use in a coating material recovery water solution. Water solution of such salts of divers concentration may be employed for coating material solids recovery purposes, a solution containing 1½% by weight of the salt having been found to operate satisfactorily both as a solids precipitating agent and as a lubricant or inhibitor to adhesion of the coating material constituents to the surfaces in which they are contained.

The foregoing solution may be used in spray booths of various constructs, the booth disclosed being illustrative of a workable recovery installation.

In the drawing is shown one form of spray chamber, generally designated by the numeral 10, with which the solid matter recovery apparatus may be used. The spraying chamber includes a casing having end walls 11 provided with registering openings 12 for accommodating the passage of articles 13 through the interior thereof. The articles are preferably conveyed through the spray chamber 10 by a conveyor which includes a rail 14 extending longitudinally of the chamber 10 and located at the upper extremities of the openings 12 thereof. The rail 14 is adapted to movably support a plurality of carriers 15 which are preferably attached to a continuous conveyor chain (not shown). The spray chamber 10 has a roof 16 in which is formed an air inlet opening 17 that communicates with a conduit 18 leading from an external or internal source of air. Disposed immediately below the air inlet 17 is an inverted frusto-conical deflector 19 having vanes 20 so constructed and arranged as to distribute the air current entering the inlet 17 throughout substantially all portions of the interior of the chamber 10. Provided at the lower longitudinal extremity of the spray chamber 10 on the side thereof opposite from the location at which the coating material is discharged upon the articles by a spray gun 21, or other suitable means, is an inclined baffle 22 which slopes downwardly and inwardly toward the central portion of the floor 23 of the chamber. An air outlet opening 24 is provided in the floor 23 adjacent the lower extremity of the baffle 22 for permitting the escape of the air admitted through the inlet 17. A grill 25 is disposed in the outlet opening 24 for the purpose of preventing the passage of articles or spray gun parts or other devices which may accidentally be dropped in the spraying chamber.

The air current is drawn through the inlet opening 17 and through the interior of the spraying chamber 10 by a blower 26 located externally of the spraying chamber and having a discharge conduit 27 which preferably leads to the atmosphere. The blower 26 includes an inlet conduit 27' which communicates with an air passage 28 disposed below the spraying chamber 10 and extending longitudinally thereof. The passage 28 leads from the outlet 24 of the spraying chamber 10 and is provided at its inlet end with curvilinear baffles 29 and 30 which direct the air passing through the outlet 24 rightwardly toward the right extremity of the passage 28. The lowermost baffle 29 extends rightwardly further than the baffle 30 but it terminates in spaced relation to the right extremity of the passage 28 so as to permit the air current to be reversed in direction of flow by a curvilinear baffle 31 located at the upper right extremity of the lowermost baffle 29 and then continues in a leftward course toward the blower 26. An eliminator 32 is provided adjacent the outlet of the air passage 28 for removing any liquid such as spray coating material, or the precipitating agent introduced into the air current in the manner hereinafter set forth, before the air enters the blower 26 and discharge pipe 27.

The spray chamber 10 and the air passage 28 are provided with means for subjecting the air current circulated through the system to the action of an agent for precipitating the solids of the excess sprayed coating material which is carried by the air current. The precipitating agent preferably comprises liquid which not only washes or otherwise removes the sprayed coating material from the air current but which also precipitates the solid constituent thereof.

In the form of the invention illustrated, a discharge pipe 33 having a plurality of relatively small outlet orifices or other spray forming means, extends longitudinally of the spray chamber 10 and is located adjacent the back wall 34 thereof. The orifices, or spray devices of the discharge pipe 33 are so constructed and arranged as to direct the precipitating agent upon the internal surface of the rear wall 34 and to cause the liquid to flow downwardly thereon substantially in the form of a sheet or curtain. The liquid precipitating agent is then directed inwardly toward the outlet opening 24 by the inclined baffle 22 and ultimately flows through the outlet openings 24 along with the air current. That portion of the excess sprayed coating material which impinges upon the sheet or curtain of liquid precipitating agent discharged by the pipe 33 is removed from the air current and the solids thereof are precipitated from their solvent. Any portion of the air ladened with spray coating material which is not subjected to the washing and precipitated action of the agent discharged by the pipe 33 is thoroughly treated with precipitating agent by a pair of spray devices 35 and 36 located in the left end portion of the air passage 28. The uppermost spray device 35 includes a plurality of outlet orifices or spray nozzles which discharge the precipitating agent in the direction of travel of the air current flowing through the section of the passage 28 above the baffle 29, and the spray device 26 likewise includes a plurality of orifices or discharge nozzles which spray precipitating agent in a direction opposite to the direction of flow of the air current through that portion of the air passage 26 located below the baffle 29. In this manner the precipitating agent is applied to the air current of the passage 28 at the location therein where the air current is reversed in the direction of movement.

Provided in the lower wall of the air passage 28 is an outlet 37 for accommodating the flow of the precipitating agent and solids of the spray coating material therefrom. The outlet 37 communicates with an elongated passageway or conduit 38 having a discharge outlet 39 which communicates with a sump 40, as illustrated.

The recovered solids from many sprayed surface coating materials will sink to the bottom of the sump in the form of a sludge and in this case the solids may be conveniently removed from the sump 40 by the aid of a liquid pervious screen 48 which is preferably disposed at the bottom of each sump 40. Cables 49 are attached to the screen 48 and preferably extended over a pulley 50 so as to enable convenient vertical movement of the screen 48 from the interior of its sump when it is desired to displace the precipitated solids therefrom.

The solids of some sprayed surface coating materials, are found to float on the top of the liquid, in the form of a scum or sludge of soft cheese or liver-like consistency, the particles of solids being cohered together in masses. The precipitate may be conveniently removed from the sump 40 by scraping the floating scum-like substance so formed into a trough 51 from which it may be conveniently removed for further operation in accordance with the recovery process.

The precipitated solids obtained in either of the foregoing ways include the non-volatile vehicle dispersed coloring matter or pigment if any and substantially all other ingredients which comprise the solids of surface coating materials. In this recovery product, the pigment if present is thoroughly dispersed in the non-volatile vehicle in substantially that condition produced by the original grinding operations employed in the initial manufacture of the coating material. These recovered products are then separated from the precipitating agent, preferably by initially removing the main portion of the latter in a press or by allowing the sludge to drain. For some purposes more complete removal of the precipitating agent may be desirable and in this event the precipitating agent is preferably washed out or extracted, with a suitable solvent therefor which will not dissolve or otherwise seriously disturb the condition of the recovered solids. The presence, however, of relatively small amounts of the solute of the precipitating solution are perfectly compatible with the recovered coating material solids and can be allowed to remain therein. The thus reconditioned recovered material may then be dissolved in a solvent of the same character as that from which it had previously been separated in order to produce surface coating material which is otherwise wasted.

Irrespective of the saving resulting from the recory of excess sprayed coating materials, the use of precipitating agents in the foregoing manner and in which the solids of the coating material are not soluble or rendered gummy, is of substantial value. The elimination of the nuisance problems involved in the discharging of air from spray booths into atmosphere in densely inhabited regions, as well as the saving in cleaning of the apparatus and removing from the walls thereof, deposited solid and semi-solid accumulations represent a material saving in spray booth operation even though no attempt is made to reuse the recovered coating materials.

The precipitating medium may be withdrawn periodically from the sump 40, filtered if desired and recirculated and reused.

The sludge recovered by precipitation with the above mentioned medium may be separated from the main bulk of the precipitating medium and directly dissolved in a suitable coating material solvent and the resulting mixture of solution may be centrifuged in a cream type separator, for example, to obtain the recovered coating material.

Although but several specific embodiments of the invention are herein shown and described, it will be understood that various changes in the steps of the process and in the materials and apparatus employed may be made without departing from the spirit of the invention.

What we claim is:

1. The process of recovering the solids of excess sprayed coating material which comprises precipitating said solids by treatment with a water solution of an alkali salt of a sulphonated hydrocarbon of the resin class and separating the resulting recovery product and said solution.

2. The process of recovering the solids of excess sprayed coating material which comprises precipitating said solids by treatment with a water solution of sulphonated abietine, and separating the resulting precipitated solids from said solution.

3. The process of recovering the solids of excess sprayed coating material which comprises precipitating said solids by treatment with a water solution of a salt of sulphonated abietine selected from the group of salts thereof consisting of sodium, potassium and calcium sulphonated abietine, and separating the resulting precipitated solids from said solution.

4. The process of recovering solids of excess sprayed coating materials which comprises precipitating said solids by subjecting said excess sprayed coating material to treatment with a water solution of a salt of sulphonated abietine selected from the group of salts thereof consisting of sodium, potassium and calcium sulphonated abietine, separating the resulting precipitated solids from the main bulk of said water solution, dissolving said solids in a conventional coating material solvent, and removing the dissolved solids from residual quantities of said water solution by centrifuging the mixture thereof.

5. The process of recovering solids of excess sprayed coating materials which comprises precipitating said solids by subjecting said excess sprayed coating material to treatment with a water solution of a salt of sulphonated abietine selected from the group of salts thereof consisting of sodium, potassium and calcium sulphonated abietine, substantially completely separating the resulting precipitate from said water solution, and incorporating said separated precipitate in a coating material solvent.

SEYMOUR G. SAUNDERS.
HARRY MORRISON.